United States Patent
Itou

(10) Patent No.: US 9,699,346 B2
(45) Date of Patent: Jul. 4, 2017

(54) IMAGE READING APPARATUS AND IMAGE FORMING SYSTEM

(71) Applicant: Konica Minolta, Inc., Chiyoda-ku, Tokyo (JP)

(72) Inventor: Jun Itou, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/015,949

(22) Filed: Feb. 4, 2016

(65) Prior Publication Data
US 2016/0234398 A1     Aug. 11, 2016

(30) Foreign Application Priority Data
Feb. 26, 2015 (JP) ................................. 2015-036364

(51) Int. Cl.
H04N 1/04 (2006.01)
H04N 1/047 (2006.01)
H04N 1/00 (2006.01)

(52) U.S. Cl.
CPC ......... *H04N 1/047* (2013.01); *H04N 1/00801* (2013.01); *H04N 1/0408* (2013.01); *H04N 1/0432* (2013.01); *H04N 2201/04794* (2013.01)

(58) Field of Classification Search
CPC ........................... H04N 1/047; H04N 1/00801
USPC .................................................. 358/498, 496
See application file for complete search history.

(56) References Cited

U.S. PATENT DOCUMENTS

2016/0130101 A1* 5/2016 Hachisuga ......... H04N 1/00588
358/474

FOREIGN PATENT DOCUMENTS

| JP | 05-083489 | 4/1993 |
| JP | 09-027879 | 1/1997 |
| JP | 2003-063116 | 3/2003 |
| JP | 2006-229515 | 8/2006 |
| JP | 2008-104165 A1 | 5/2008 |

OTHER PUBLICATIONS

Rejection Notice issued in corresponding Japanese Patent Application No. 2015-036364, dated Apr. 18, 2017, with English Translation (7 pages).

* cited by examiner

*Primary Examiner* — Cheukfan Lee
(74) *Attorney, Agent, or Firm* — Buchanan Ingersoll & Rooney PC

(57) ABSTRACT

An image reading apparatus can inhibit image disturbance and density unevenness. The image reading apparatus includes a first conveyance roller pair, a back side image reading unit, a second conveyance roller pair, a front side image reading unit, a third conveyance roller pair, and a control unit. The control unit compares the image data read by the back side image reading unit and the image data read by the front side image reading unit to calculate a relative magnification variation there between, corrects the reading time of the front side image reading unit for each line based on the calculated relative magnification variation, and performs, in accordance with correction of the reading time, image correction of the image data of the front side image reading unit which has been corrected with respect to the reading time.

17 Claims, 5 Drawing Sheets

IMAGE READING APPARATUS AND IMAGE FORMING SYSTEM

CROSS-REFERENCE TO RELATED APPLICATIONS

The present application claims priority under 35 U.S.C. §119 to Japanese Patent Application No. 2015-036364, filed Feb. 26, 2015. The contents of this application are herein incorporated by reference in their entirety.

BACKGROUND OF THE INVENTION

Field of the Invention

The present invention relates to an image reading apparatus and an image forming system.

Description of the Related Art

Heretofore, an image reading apparatus is known which reads a sheet output from an image forming apparatus and processes the read image data for the purpose of improving the print performance of the image forming apparatus. The image reading apparatus is provided with a line sensor (image reading unit) consisting of elements which are linearly arranged in the sheet width direction perpendicular to the sheet conveying direction, and paper conveying units located in the upstream and downstream sides of this line sensor respectively. When the paper conveying unit conveys a sheet on which a predetermined pattern is formed, this image reading apparatus outputs image data by reading the sheet with the line sensor. Necessary data can be calculated based on this image data for performing calibration of the gradation characteristics of images and image position adjustment of the front and back sides.

For example, Japanese Patent Published Application No. 2008-104165 discloses an image reading apparatus provided with image reading units which read the front and back sides of a sheet (original) respectively in order that the image reading unit for reading the front side is located in the upstream side of the image reading unit for reading the back side. In this type of the image reading apparatus, the conveying speed of a sheet increases when the sheet enters a discharge roller in the downstream side of in the conveying direction. Because of this, the read image is influenced by magnification variation (variation in reading magnification of an image) within the surface of a sheet in the conveying direction of the sheet. As a result, the read size of the read image in the front side and the read size of the read image in the back side are reduced in the conveying direction as compared with the actual sheet size. Particularly, the read size of the read image of the back side tends to be further reduced as compared with that of the front side.

For this reason, in the case of the image reading apparatus disclosed in Japanese Patent Published Application No. 2008-104165, the read size of the read image in the front side is adjusted in order to coincide with the actual sheet size by decreasing the conveying speed of a conveyance roller which determines the conveying speed of the sheet before reaching a discharge roller. Also, with respect to the read size of the read image in the back side, the reading time of the image reading unit for each line in the back side is shortened in order that the read size of the read image of the back side coincides with the actual sheet size. The reading time is determined in accordance with the sheet size and uniformly applicable to the entirety of the paper surface. The Published Application also describes an alternative method of switching the reading time for each line to a shorter time with the timing when a sheet enters the discharge roller, and uniformly applying the shorter time thereafter for reading an image. The shorter time after switching is determined in accordance with the sheet size in the same manner.

However, in the case of the method disclosed in Japanese Patent Published Application No. 2008-104165, since the reading time, even if shortened, is uniformly fixed after switching, there is the possibility that an image is disturbed. Also, if the reading time is shortened, the quantity of light entering the line image sensor decreases so that density unevenness of an image may occur.

Taking into consideration the above circumstances, it is an object of the present invention therefore to provide an image reading apparatus and an image forming system in which image disturbance and density unevenness can be inhibited.

SUMMARY OF THE INVENTION

To achieve at least one of the above-mentioned objects, reflecting one aspect of the present invention, an image reading apparatus comprises: a first conveyance unit structured to convey a sheet; a first image reading unit located in a downstream side of the first conveyance unit in a conveying direction, and structured to read the sheet for each line in a sheet width direction and output image data; a second conveyance unit located in a downstream side of the first image reading unit in the conveying direction, and structured to convey the sheet; an arithmetic unit structured to calculate a nonlinear magnification variation based on the image data read by the first image reading unit with respect to the sheet on which a predetermined pattern is formed; an image reading control unit structured to correct a reading time per line of the first image reading unit based on the calculation result by the arithmetic unit; and an image correction unit structured to perform, in accordance with correction of the reading time, image correction of the image data of the first image reading unit which has been corrected by the image reading control unit with respect to the reading time.

In accordance with the present invention as described above, it is preferred that the magnification variation includes a magnification variation in the conveying direction caused by a differential conveying speed between the first conveyance unit and the second conveyance unit.

Also, in accordance with the present invention as described above, it is preferred that the image reading apparatus further comprises a second image reading unit located in a downstream side of the second conveyance unit in the conveying direction, and structured to read, for each line in the sheet width direction, a second paper surface of the sheet opposite a first paper surface which is a paper surface of the sheet read by the first image reading unit, and output image data; and a third conveyance unit located in a downstream side of the second image reading unit and structured to convey the sheet. In this case, it is preferred that the arithmetic unit calculates a nonlinear magnification variation based on the image data read by the second image reading unit with respect to the sheet on which the predetermined pattern is formed, that the image reading control unit corrects a reading time per line of the second image reading unit based on the calculation result by the arithmetic unit, and that the image correction unit performs, in accordance with correction of the reading time, image correction of the image data of the second image reading unit which has been corrected by the image reading control unit with respect to the reading time.

Furthermore, it is preferred that the magnification variation includes a magnification variation in the conveying direction caused by differential conveying speeds among the first conveyance unit, the second conveyance unit and the third conveyance unit. Still further, it is preferred that the sheet on which the predetermined pattern is formed is a test sheet on which the predetermined pattern has been printed in advance in order that a magnification is guaranteed, and that the image reading apparatus further comprises a sheet feeding unit structured to feed the test sheet to the image reading apparatus.

Still further, in accordance with the present invention as described above, it is preferred that an image forming apparatus further comprising a sheet receiving unit structured to receive the sheet on which the predetermined pattern is formed by an image forming apparatus, and transfer the received sheet to the first conveyance unit.

Still further, in accordance with the present invention as described above, it is preferred that the sheet receiving unit is supplied with a first sheet which is front/back reversed after the predetermined pattern is formed thereon by the image forming apparatus, and a second sheet on which the predetermined pattern is formed, and wherein the arithmetic unit compares the image data of the first image reading unit and the image data of the second image reading unit, and calculates a relative magnification variation of one image data in relation to the other image data.

Still further, in accordance with the present invention as described above, it is preferred that the arithmetic unit calculates the relative magnification variation of the image data of the second image reading unit in relation to the image data of the first image reading unit.

Still further, in accordance with the present invention as described above, it is preferred that the arithmetic unit calculates the relative magnification variation of the image data of the first image reading unit in relation to the image data of the second image reading unit.

Still further, in accordance with the present invention as described above, it is preferred that the image reading control unit corrects the reading time per line in accordance with the magnification variation on a line-by-line basis.

Still further, in accordance with the present invention as described above, it is preferred that the image correction unit performs density correction of an image in accordance with the correction amount of the reading time.

Still further, in accordance with the present invention as described above, it is preferred that the image correction unit performs shading compensation for each line of an image data after correction of the reading time, and performs density correction for each line of the image data after shading compensation on a line-by-line basis.

Still further, in accordance with the present invention as described above, it is preferred that the image correction unit performs shading compensation and the density correction for each line of the image data after correction of the reading time on a line-by-line basis.

DETAILED DESCRIPTION OF THE PREFERRED EMBODIMENT

Figure 1:
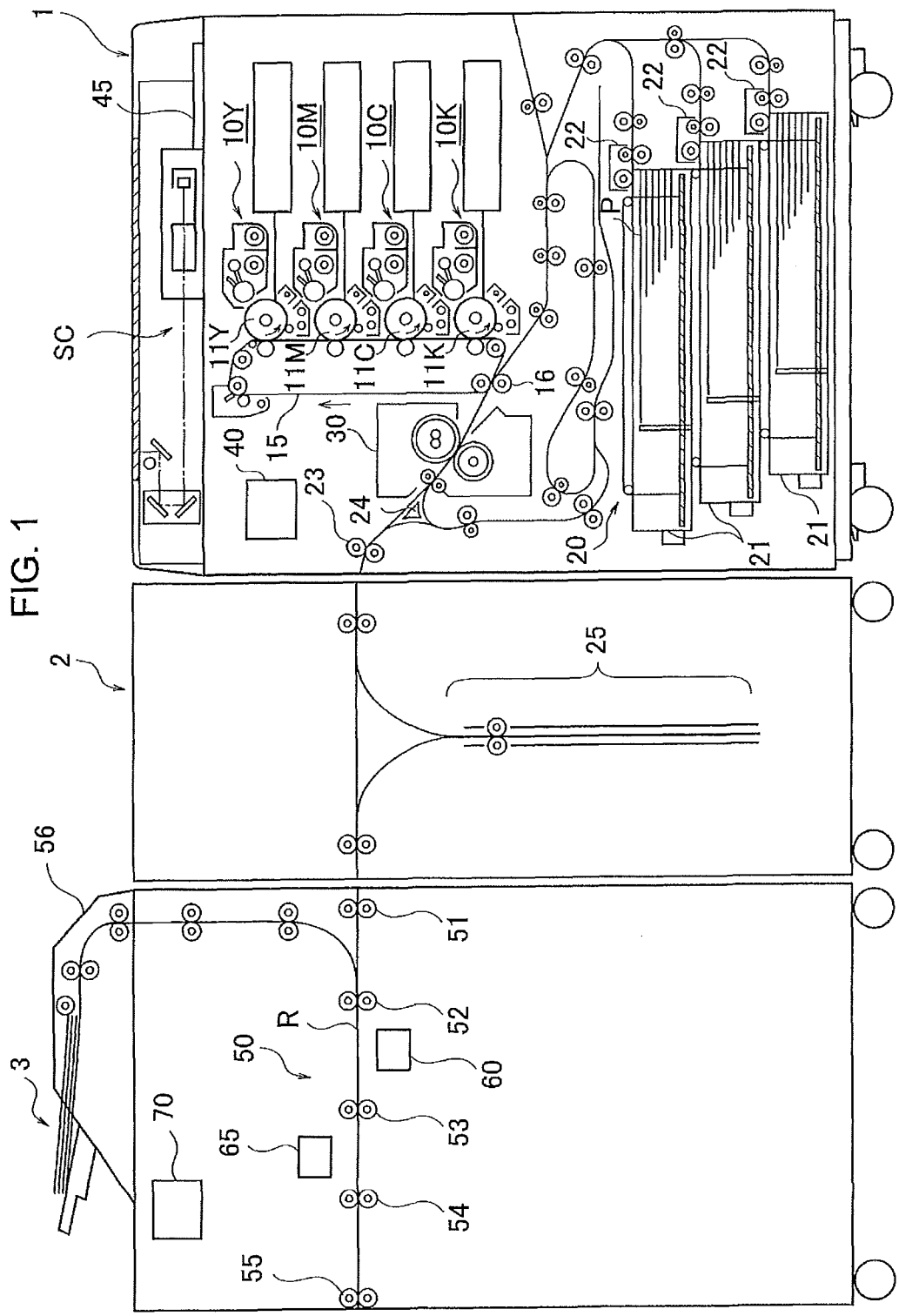
FIG. 1 is an explanatory view for schematically showing the configuration of an image forming system in accordance with an embodiment of the present invention.

FIG. 1 is an explanatory view for schematically showing the configuration of an image forming system in accordance with the present embodiment. The image forming system of the present embodiment consists of an image forming apparatus 1, an intermediate conveyance unit 2 and an image reading apparatus 3.

The image forming apparatus 1 is, for example, an electrophotographic image forming apparatus called a tandem color image forming apparatus which includes a plurality of photoreceptor drums vertically arranged in contact with one intermediate transfer belt to form full-color images. This image forming apparatus 1 consists mainly of an original reading units SC, four image forming units 10Y, 10M, 10C and 10K, a fixing unit 30, and a control unit 40.

The original reading unit SC irradiates the image of an original with an optical system of a lighting system, and reads the reflected light therefrom with a line image sensor to obtain image signals. The image signals are processed by performing A/D conversion, shading compensation, data compression and so on, and input to the control unit 40 as image data. Incidentally, the image data input to the control unit 40 is not limited to the image data as captured by the original reading unit SC, but can be the data for example as received from another image forming apparatus body, a personal computer or the like connected to the image forming apparatus body, or stored in a portable recording medium such as a semiconductor memory.

These four image forming units 10Y, 10M, 10C and 10K are an image forming unit 10Y for forming yellow (Y) images, an image forming unit 10M for forming magenta (M) images, an image forming unit 10C for forming cyan (C) images, and an image forming unit 10K for forming black (K) images. The image forming units 10Y, 10M, 10C and 10K consist of photoreceptor drums 11Y, 11M, 11C and 11K respectively, each of which is provided therearound with a charging unit, an optical writing unit, a development apparatus and a drum cleaner.

The surfaces of the photoreceptor drums 11Y, 11M, 11C and 11K are uniformly charged with electricity by the charging units, and the optical writing units perform a scanning exposure process to form latent images on the photoreceptor drums 11Y, 11M, 11C and 11K respectively. The development apparatuses then make visible the latent images on the photoreceptor drums 11Y, 11M, 11C and 11K respectively by developing the images with toners. Predetermined color images (toner images) are thereby formed on the photoreceptor drums 11Y, 11M, 11C and 11K respectively corresponding to yellow, magenta, cyan and black. The toner images formed on the photoreceptor drums 11Y, 11M, 11C and 11K are transferred to a predetermined location of an intermediate transfer belt 15 through first transfer rollers.

After transferred to the intermediate transfer belt 15, the toner images are transferred by a second transfer roller 16 to a sheet P conveyed with a predetermined timing by a paper feed unit 20 to be described below. The second transfer roller 16 is located in contact with the intermediate transfer belt 15 under pressure to form a nip portion therebetween.

The paper conveying unit 20 conveys sheets P which are fed from a paper feed unit 21 along a conveying route. In the paper feed unit 21, sheets P are stored in paper feed trays, extracted from the paper feed trays by paper feeding devices 22 and transferred to the conveyance route by paper feed units 22. There are a plurality of paper conveyance units in the conveying route for conveying sheets P. Each conveyance unit consists of a pair of rollers which are urged against each other. At least one of the pair of rollers is rotated by power supplied from a drive mechanism consisting of an electric motor.

The fixing unit 30 is an apparatus which performs a fixing process for a sheet P to which an image has been transferred. The fixing unit 30 consists, for example, of a pair of fixing rollers urged against each other to form a fixing nip portion therebetween, and a heater for heating one or both of the fixing rollers. This fixing unit 30 fixes an image to a sheet P under the pressure applied between the pair of fixing rollers and the heat applied through the fixing rollers. After the fixing unit 30 processes the sheet P by the fixing treatment, the sheet P is discharged outwards by discharging rollers 23.

In the case where an image is to be formed also on the back side of a sheet P, the sheet P with the image formed on the front side is conveyed to a refeed conveying route through a switching gate 24. The refeed conveying route includes reversing rollers which hold the tail edge of the conveyed sheet P and then reverses the sheet P by sending back it to reverse the front and back sides of the sheet P. After reversing the front and back sides, the sheet P is conveyed by a plurality of conveyance roller pairs and returned to a predetermined location of the conveying route for the purpose of supplying the sheet P to form an image on the other side.

The control unit 40 is responsible for integrally controlling the image forming apparatus 1 and can be implemented with a microcomputer mainly including a CPU, a ROM, a RAM, and an I/O interface. The control unit 40 forms an image on a sheet P by controlling the image forming units 10Y, 10M, 10C and 10K and the like.

In addition to this, the control unit 40 generally controls the entire image forming system by mutually communicating a control unit (not shown in the figure) of the intermediate conveyance unit 2 and the control unit 70 of the image reading apparatus 3 to cooperate with each other.

The operation panel 45 is an input unit in the form of a touch panel through which information can be input in accordance with information displayed on a display. A user can set a variety of parameters such as information about sheet P, the density and reduce/enlarge ratio of images and selection of a paper tray to be used as a paper supply source by operating the operation panel 45. These settings are acquired by the control unit 40. Also, the operation panel 45 is controlled by the control unit 40 and functions also as a display unit through which the user can be informed of various items of information for reference.

The intermediate conveyance unit 2 is located in the downstream side of the image forming apparatus 1, receives sheets P discharged from the image forming apparatus 1, and conveys and outputs this sheet P to the image reading apparatus 3. This intermediate conveyance unit 2 is provided with a sheet reversing unit 25 which is used to reverse the front and back sides of a sheet P. The sheet reversing unit 25 can reverse the front and back sides of a sheet P conveyed on the conveying route by first directing the sheet P to the lower position of the apparatus, and returning the sheet P to the conveying route after switchback operation. Meanwhile, the intermediate conveyance unit 2 can convey the sheet P as it is to the image reading apparatus 3, rather than reversing the front and back sides thereof, by conveying the sheet P without forwarding the sheet P to the sheet reversing unit 25.

The image reading apparatus 3 is located in the downstream side of the intermediate conveyance unit 2. After receiving a sheet P output from the intermediate conveyance unit 2, the image reading apparatus 3 reads this sheet P and perform various processes based on the image data as read. For example, the image reading apparatus 3 is used to calculate information for adjusting (calibrating) the gradation characteristics of images and aligning images on the front and back sides.

The image reading apparatus 3 is provided with a paper conveying unit 50, a back side image reading unit 60, a front side image reading unit 65, and a control unit 70.

After receiving a sheet P output from the intermediate conveyance unit 2, the paper conveying unit 50 conveys and discharges this sheet P to a catch tray (not shown in the figure). The paper conveying unit 50 consists, for example, of five conveyance roller pairs 51 to 55. The conveyance roller pairs 51 to 55 are arranged in the conveying direction from the upstream side to the downstream side in the order of the conveyance roller pair 51, the conveyance roller pair 52, the conveyance roller pair 53, the conveyance roller pair 54 and the conveyance roller pair 55.

The conveyance roller pair 51 located on the most upstream side is a conveyance roller pair (sheet receiving unit), which receives a sheet P output from the image forming apparatus 1 through the intermediate conveyance unit 2, and transfers the sheet P to the conveyance roller pair 52 in the downstream side thereof. The conveyance roller pair 51 is located in the position corresponding to a sheet discharging position of the intermediate conveyance unit 2.

The conveyance roller pair 52 (first conveyance unit) is one of conveyance roller pairs arranged on the conveying route R from the conveyance roller pair 51 to the conveyance roller pair 55 and arranged in the downstream side of the conveyance roller pair 51 in the case of the present embodiment. In what follows, this conveyance roller pair 52 is referred to as "the first conveyance roller pair 52" if necessary.

The conveyance roller pair 53 (second conveyance unit) is one of conveyance roller pairs arranged on the conveying route R and arranged in the downstream side of the conveyance roller pair 52 in the case of the present embodiment. In what follows, this conveyance roller pair 53 is referred to as "the second conveyance roller pair 53" if necessary.

The conveyance roller pair 54 (third conveyance unit) is one of conveyance roller pairs arranged on the conveying route R and arranged in the downstream side of the conveyance roller pair 53 in the case of the present embodiment. In what follows, this conveyance roller pair 54 is referred to as "the third conveyance roller pair 54" if necessary.

Next is a description of the relationship among these three conveyance roller pairs 52, 53 and 54. Of the three conveyance roller pairs 52, 53 and 54, the conveyance roller pair located in a more downstream position in the conveying direction has a larger roller diameter. Specifically, the roller diameter of the second conveyance roller pair 53 is larger than that of the first conveyance roller pair 52, and the roller diameter of the third conveyance roller pair 54 is larger than that of the second conveyance roller pair 53. Since these conveyance roller pairs 52, 53 and 54 are controlled to rotate at the same angular velocity, the conveyance roller pair located in a more downstream position in the conveying direction has a larger speed of conveying a sheet P. This is for the purpose of smoothly conveying a sheet P by making the conveyance roller pair in a downstream side to have a relatively large conveying speed.

Also, the first conveyance roller pair 52 and the second conveyance roller pair 53 are arranged in order that the leading edge of a sheet P enters the second conveyance roller pair 53 before the tail edge of the sheet P is passed through the first conveyance roller pair 52. Likewise, the second conveyance roller pair 53 and the third conveyance roller pair 54 are arranged in order that the leading edge of a sheet P enters the third conveyance roller pair 54 before the tail edge of the second conveyance roller pair 53.

The conveyance roller pair 55 is a discharging roller pair for discharging a sheet P conveyed on the conveying route R to an outside tray.

Incidentally, the image reading apparatus 3 can take in not only a sheet P which is output from the image forming apparatus 1, but also a sheet P which is supplied through a sheet feeding unit 56. The sheet feeding unit 56 is located on the top of the housing of the image reading apparatus 3 for taking in sheets P placed on a paper loading member one by one and conveying each sheet P to the conveying route R in the upstream side of the conveyance roller pair 52.

The back side image reading unit 60 is used to read the back side of a sheet P (first paper surface of a sheet P) conveyed on the conveying route R (as a first image reading unit). The back side image reading unit 60 is located between the first conveyance roller pair 52 and the second conveyance roller pair 53 under the conveying route R in order to face a sheet P conveyed on the conveying route R. Meanwhile, in this description of the image reading apparatus 3, the front side of a sheet P is meant to be the upper surface of the sheet P conveyed in the image reading apparatus 3, and the back side is meant to be the surface opposite thereto. The front and back sides are not necessarily corresponding to the main side (the surface on which an image is primarily printed) and the rear side (the surface on which an image is secondarily printed) respectively during image formation process.

The back side image reading unit 60 consists mainly of a light source which radiates light to a sheet P which is passed through a detection position (a predetermined position on the conveying route R) and a line image sensor consisting for example of CCDs or CISs. The line image sensor consists of a plurality of elements which are linearly arranged in the sheet width direction (in the direction perpendicular to the sheet conveyance direction) to photo-electrically convert light in correspondence with picture elements respectively. The reading area of the back side image reading unit 60 is determined to cover the maximum width of a sheet P. In synchronization with a sheet P passing through the detection position, the back side image reading unit 60 reads an image on a line-by-line basis in the sheet width direction to output image data. The image data output from the back side image reading unit 60 is output to the control unit 70. Two-dimensional image data corresponding to the read image of the sheet P is output to the control unit 70 by reading operation throughout the entirety of the paper surface.

The front side image reading unit 65 is used to read the front side of a sheet P (second paper surface of a sheet P) conveyed on the conveying route R (as a second image reading unit). The front side image reading unit 65 is located between the second conveyance roller pair 53 and the third conveyance roller pair 54 under the conveying route R in order to face a sheet P conveyed on the conveying route R.

The front side image reading unit 65 consists mainly of a light source which radiates light to a sheet P which is passed through a detection position (a predetermined position on the conveying route R) and a line image sensor consisting for example of CCDs or CISs. The line image sensor consists of a plurality of elements which are linearly arranged in the sheet width direction (n the direction perpendicular to the sheet conveyance direction) to photo-electrically convert light in correspondence with picture elements respectively. The reading area of the front side image reading unit 65 is determined to cover the maximum width of a sheet P. In synchronization with a sheet P passing through the detection position, the front side image reading unit 65 reads an image on a line-by-line basis in the sheet width direction to output image data. The image data output from the front side image reading unit 65 is output to the control unit 70. Two-dimensional image data corresponding to the read image of the sheet P is output to the control unit 70 by reading operation throughout the entirety of the paper surface.

The control unit 70 is responsible for integrally controlling the image reading apparatus 3 and can be implemented with a microcomputer mainly including a CPU, a ROM, a RAM, and an I/O interface. The control unit 70 can calculate necessary data for performing calibration of the gradation characteristics of images and image position adjustment of the front and front sides based on the image data output from the back side image reading unit 60 and the front side image reading unit 65.

Figure 2:
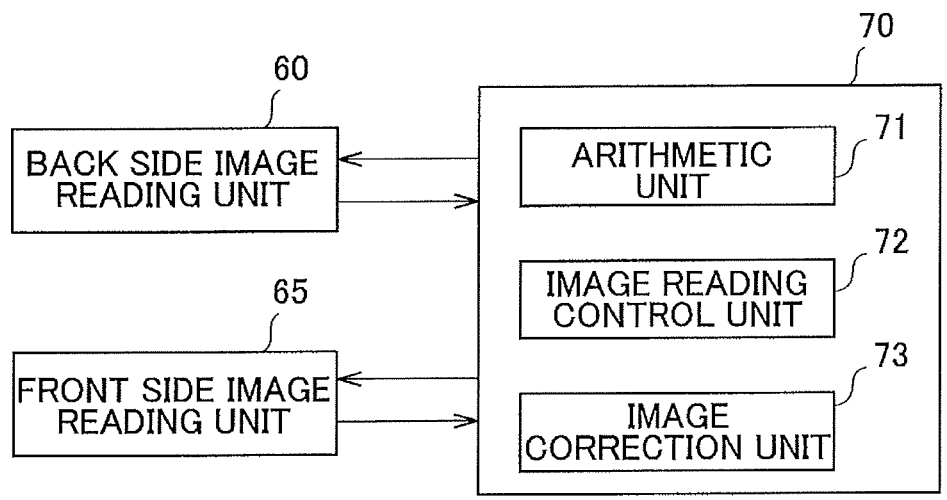
FIG. 2 is an explanatory view for showing the functional configuration of a control unit of the image forming system.

FIG. 2 is an explanatory view for showing the functional configuration of the control unit 70. As seen from a functional view point in relation to the present embodiment, the control unit 70 includes an arithmetic unit 71, an image reading control unit 72 and an image correction unit 73.

The arithmetic unit 71 calculates a nonlinear magnification variation based on the image data. In this description, the magnification variation means the variation in reading magnification of an image.

Figure 3:
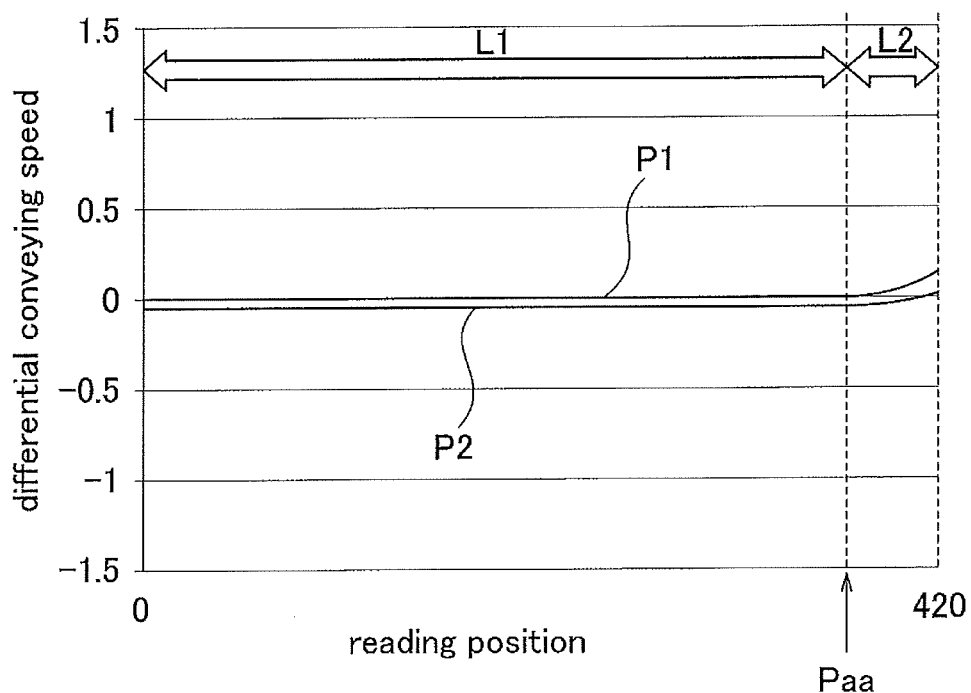
FIG. 3 is a view for explaining the magnification variation of a back side image reading unit which is the image reading unit in an upstream side.

FIG. 3 is a view for explaining the magnification variation of the back side image reading unit 60 which is the image reading unit in the upstream side. In the same figure, the abscissa is the position on a sheet (reading position) to be read by the back side image reading unit 60 and defined in accordance with the distance from the leading edge of the sheet. In this example, the maximum length of a sheet P is "420 mm" in the conveying direction. "Paa" points to the read position of the back side image reading unit 60 when the tail edge of the sheet P is passed through the first conveyance roller pair 52. The ordinate is the differential conveying speed when the sheet P is passed through the back side image reading unit 60, i.e., the paper feeding amount (mm) of the sheet P per unit time as the difference from the paper feeding amount through the first conveyance roller pair 52. Incidentally, "P1" is the curve plotted in the case where the sheet P is a standard sheet, and "P2" is in the case where the sheet P is a cardboard.

As understood from the same figure, the conveying speed of a sheet P depends on the first conveyance roller pair 52 (in the range of distant L1) when the sheet P is held by the first conveyance roller pair 52 or when the sheet P is held by both the first conveyance roller pair 52 and the second conveyance roller pair 53. However, once the tail edge of the sheet P is passed through the first conveyance roller pair 52, the conveying speed of the sheet P increases toward the conveying speed of the second conveyance roller pair 53 (in the range of distant L2).

Because of this, as compared with the expected read image, the read image is reduced in a region near the tail edge of the sheet P (the region to 420 mm position from Paa) resulting in a nonlinear magnification variation in the conveying direction. The feature of this magnification variation depends on the type of paper.

Figure 4:
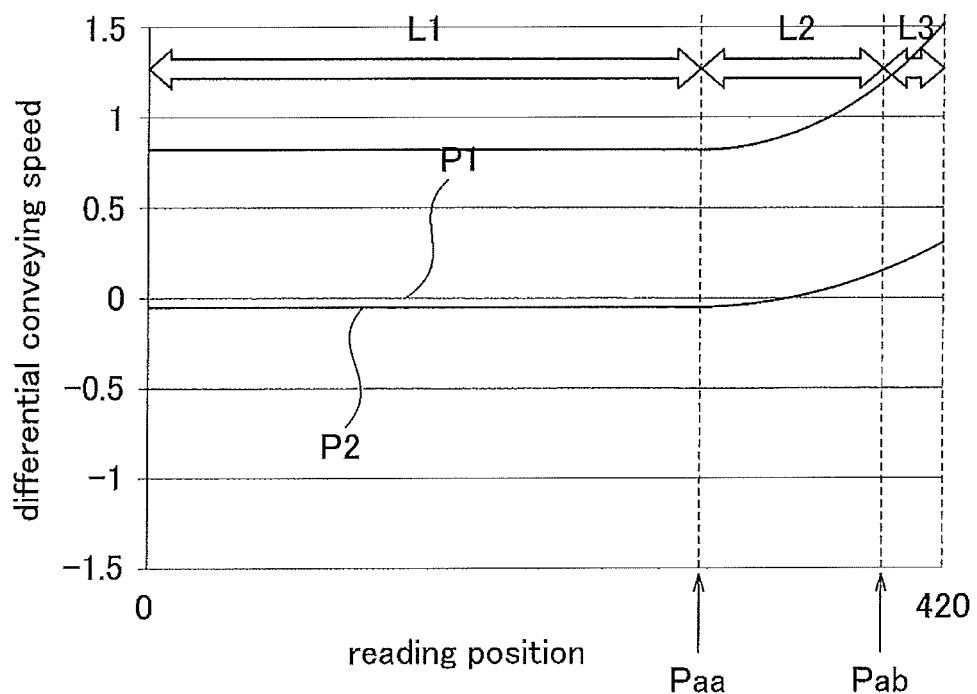
FIG. 4 is a view for explaining the magnification variation of a front side image reading unit which is the image reading unit in a downstream side.

FIG. 4 is a view for explaining the magnification variation of the front side image reading unit 65 which is the image reading unit in the downstream side. Basically, this figure can be understood in the same manner as FIG. 3. Incidentally, "Paa" points to the read position of the front side image reading unit 65 when the tail edge of the sheet P is passed through the first conveyance roller pair 52, and "Pab" points to the read position of the front side image reading unit 65 when the tail edge of the sheet P is passed through the second conveyance roller pair 53.

As understood from the same figure, the conveying speed of a sheet P depends on the first conveyance roller pair 52 (in the range of distant L1) when the sheet P is held by the first conveyance roller pair 52 or when the sheet P is held by both the first conveyance roller pair 52 and the second conveyance roller pair 53. However, once the tail edge of the sheet P is passed through the first conveyance roller pair 52, the conveying speed of the sheet P increases toward the conveying speed of the second conveyance roller pair 53 (in the range of distant L2). Furthermore, after the tail edge of the sheet P is passed through the second conveyance roller pair 53, the conveying speed of the sheet P increases toward the conveying speed of the third conveyance roller pair 54 (in the range of distant L3).

Because of this, as compared with the expected read image, the read image is reduced in a region near the tail edge of the sheet P (the region to 420 mm position from Paa) resulting in a nonlinear magnification variation in the conveying direction. Particularly, since the front side image reading unit 65 is located further away from the first conveyance roller pair 52 than the back side image reading unit 60, the front side image reading unit 65 is more influenced by the magnification variation than the back side image reading unit 60. As a result, the read image of the front side image reading unit 65 becomes a further reduced image than the read image of the back side image reading unit 60. The feature of such a magnification variation depends on the type of paper.

For this reason, in the case of the present embodiment, a first and a second sheet P on which a ladder pattern is formed by the image forming apparatus 1 are input to the image reading apparatus 3 for the purpose of inhibiting such a nonlinear magnification variation. The first sheet P is reversed by the intermediate conveyance unit 2 and input to the image reading apparatus 3 in order that the paper surface on which the ladder pattern is formed becomes the back side of the first sheet P, which is then read by the back side image reading unit 60. On the other hand, the second sheet P is not reversed by the intermediate conveyance unit 2 and input to the image reading apparatus 3 in order that the paper surface on which the ladder pattern is formed becomes the front side of the first sheet P, which is then read by the front side image reading unit 65.

The arithmetic unit 71 then compares the image data read by the back side image reading unit 60 and the image data read by the front side image reading unit 65, and calculates the relative nonlinear magnification variation of the image data of one of these image reading units in relation to the image data of the other image reading unit. Since the magnification variation of the image data of the back side image reading unit 60 is smaller than that of the front side image reading unit 65 as described above, the arithmetic unit 71 of the present embodiment calculates the relative nonlinear magnification variation of the image data of the front side image reading unit 65 in relation to the image data of the back side image reading unit 60. The nonlinear magnification variation of the image data of the front side image reading unit 65 (the magnification variation in the front side) can be thereby calculated.

The image reading control unit 72 performs correction of the reading time per line by the front side image reading unit 65 based on the magnification variation in the front side calculated by the arithmetic unit 71. This correction is to change the reading time from a base reading time, and effective to prevent the read image of the front side image reading unit 65 from being reduced from the expected read image. The correction of the reading time is performed for each line in accordance with the magnification variation of this each line. Needless to say, the correction amount is zero at the line where no magnification variation exists so that effective correction is limited to lines where magnification variation occurs.

Also, when the reading time is corrected per line by the front side image reading unit 65 to change the reading time from the base reading time, the quantity of light entering the line image sensor is changed. Because of this, density unevenness may occur in an image due to the correction of the reading time. The image correction unit 73 therefore performs image correction of the image data of the front side image reading unit 65 in accordance with the correction of the reading time, i. e., image density correction.

Figure 5:
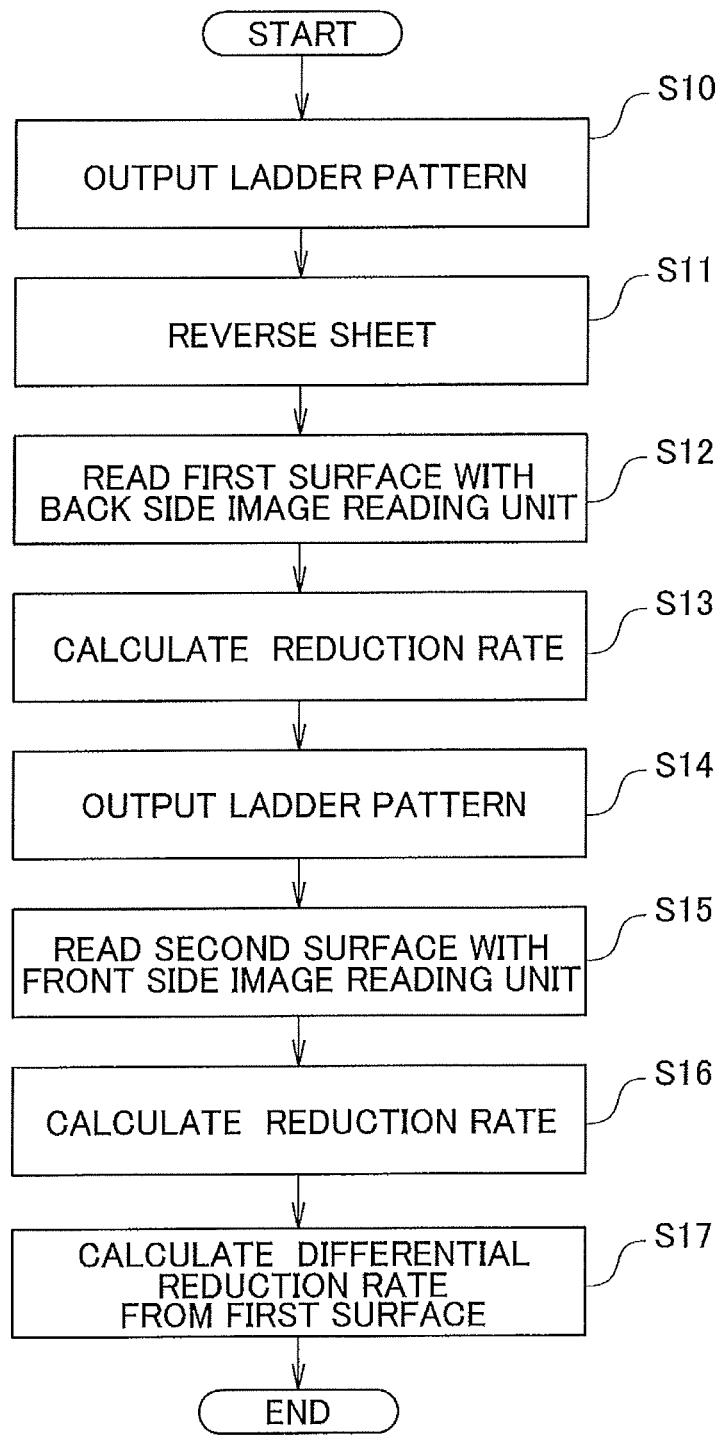
FIG. 5 is a flow chart for showing the control operation of the image forming system in accordance with the present embodiment.

FIG. 5 is a flow chart for showing the control operation of the image forming system in accordance with the present embodiment. The process shown in this flow chart is performed by the control unit 40 of the image forming apparatus 1 and the control unit 70 of the image reading apparatus 3 in cooperation with each other in response to an adjustment command input by a user or in accordance with a predetermined maintenance cycle as a trigger.

First, in step 10 (S10), the control unit 40 of the image forming apparatus 1 forms a ladder pattern on the one surface of a sheet P (for example, the front side of the sheet P in the image forming apparatus 1), followed by outputting the sheet P. The ladder pattern is a pattern formed on the entirety of the sheet P and consisting of a group of parallel lines spaced at predetermined intervals or consisting of a pair of such groups which are orthogonally combined. Incidentally, the ladder pattern may be formed on both sides of the sheet P rather than on only one side.

In step 11 (S11), the control unit 40 of the image forming apparatus 1 instructs the intermediate conveyance unit 2 to reverse a sheet P for the purpose of reading the first paper surface of the sheet P with the back side image reading unit 60. The intermediate conveyance unit 2 reverses the front and back sides of the sheet P in response to the reversing instruction. Because of this, the sheet P discharged from the intermediate conveyance unit 2 enters the image reading apparatus 3 with the pattern formed surface facing downward.

In step 12 (S12), the control unit 70 of the image reading apparatus 3 controls the back side image reading unit 60 to perform reading operation in synchronization with the timing of passing the sheet P with reference to the detection result of a sheet detection sensor (for example, located in the upstream side of the back side image reading unit 60) which is not shown in the figure. The read image of the sheet P with the ladder pattern (as a reading image of the first paper surface of a sheet P) is output to the control unit 70 as image data.

In step 13 (S13), the control unit 70 analyzes the image data of the back side image reading unit 60 and calculates the reduction rate in the image plane. For example, the reduction rate is calculated for each predetermined number of lines. When a sheet P is output from the image forming apparatus 1, the sheet P may be contracted by thermal effect in a fixing period. The control unit 70 has reference data indicative of the geometric characteristics of the ladder pattern, and calculates the reduction ratio of the image (sheet P) mainly due to fixing process by comparing the image data with the reference data in step 13.

In step 14 (S14), the control unit 40 of the image forming apparatus 1 forms the ladder pattern on the one surface of a sheet P (for example, the front side of the sheet P in the image forming apparatus 1), and outputs the sheet P. Meanwhile, since the first paper surface of the sheet P is read by the front side image reading unit 65 in step 15 (S15), there is provided no step corresponding to step 11 as described above so that the sheet P is not reversed by the intermediate conveyance unit 2.

In step 15 (S15), the control unit 70 of the image reading apparatus 3 controls the front side image reading unit 65 to perform reading operation in synchronization with the timing of passing the sheet P with reference to the detection result of the sheet detection sensor. The read image of the sheet P with the ladder pattern (as a reading image of the second paper surface of a sheet P) is output to the control unit 70 as image data.

In step 16 (S16), the control unit 70 analyzes the image data of the front side image reading unit 65 and calculates the reduction rate in the image plane. For example, the reduction rate is calculated for each predetermined number of lines.

Then, in step 17 (S17), the control unit 70 calculates the in-plane differential reduction rate of the image data of the front side image reading unit 65 from the reduction rate which is calculated based on the image data of the back side image reading unit 60. By this process, the magnification variation of the image data of the front side image reading unit 65 (image date of the second surface of a sheet P) is calculated as the magnification variation in relation to the image data of the back side image reading unit 60 (image date of the first surface of a sheet P). The magnification variation toward reduction mainly caused by the variation in the speed of the sheet P after passing the tail edge of the sheet P through the first conveyance roller 52 can thereby be determined.

When the magnification variation of the image data of the front side image reading unit 65 is determined as described above, this information about the magnification variation is used by the front side image reading unit 65 to adjust the reading time, and the information about the reading time adjustment is used to performs image correction process of correcting the image data of the front side image reading unit 65.

Figure 6:
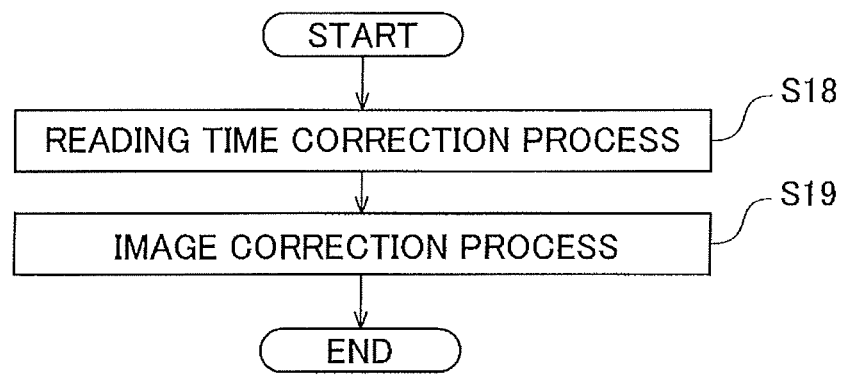
FIG. 6 is a flow chart for showing the process of correction control with respect to the front side image reading unit of an image reading apparatus.

FIG. 6 is a flow chart for showing the process of correction control with respect to the front side image reading unit 65 of the image reading apparatus 3. The process shown in this flow chart is performed by the control unit 70 of the image reading apparatus 3 with the read operation of the front side image reading unit 65 as a trigger.

Figure 7:
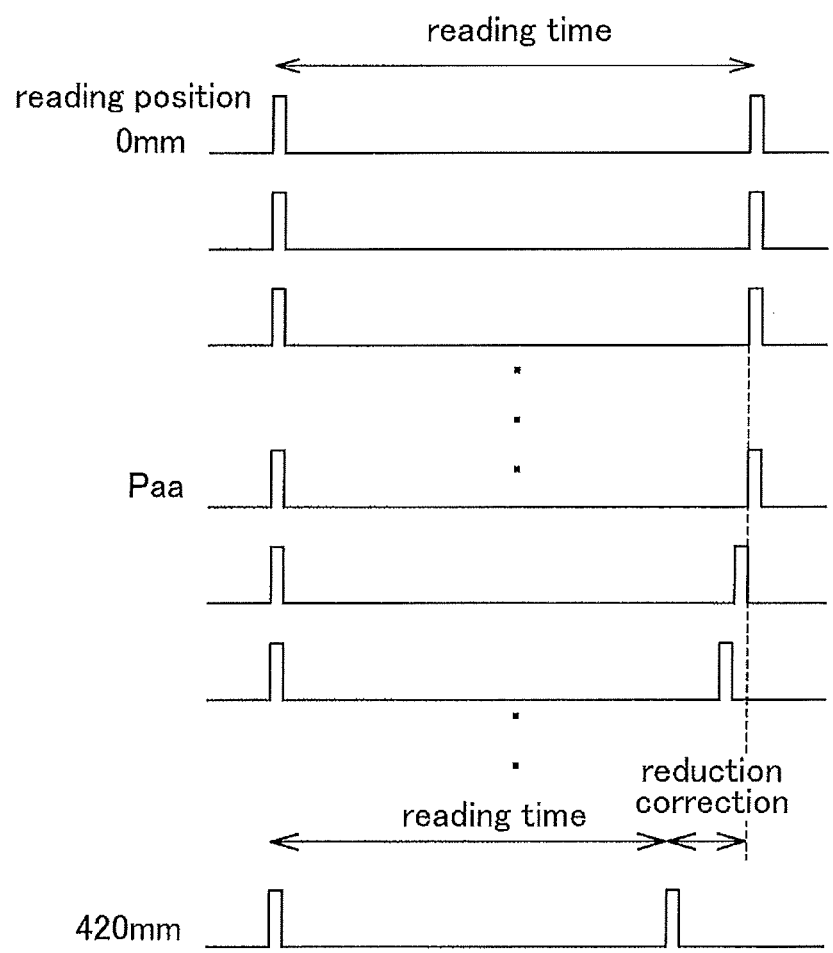
FIG. 7 is an explanatory view for schematically showing the concept of a reading time correction process.

First, in step 18 (S18), the control unit 70 performs correction of the reading time per line by the front side image reading unit 65 for each line based on the magnification variation calculated of the image data of the front side image reading unit 65 (reading time correction process). FIG. 7 is an explanatory view for schematically showing the concept of the reading time correction process. As shown in the same figure, the control unit 70 performs reduction correction of the scanning time for each line in accordance with the magnification variation of this each line. Since the conveying speed increases when reading operation is performed beyond the reading position Paa after the tail edge of the sheet P is passed through the first conveyance roller 52, as illustrated in FIG. 7, a magnification variation shall occur in the reduction direction if the reading time is constant. Because of this, the reading time is corrected to reduce in correspondence with the magnification variation in the reduction direction.

In step 19 (S19), the control unit 70 performs the image correction process. When the reading time per line is corrected to reduce from a normal reading time, the quantity of light entering the line image sensor is reduced. Because of this, density unevenness may occur in an image due to the correction of the reading time. Hence, in accordance with the correction of the reading time, the control unit 70 performs image density correction of the image data of the front side image reading unit 65 which has been corrected with respect to the reading time. With respect to an actual method of correcting the density, the control unit 70 stores a table showing the correspondence between the correction amounts of the reading time and the correction amounts of the density, and performs correction of the density in accordance with the correction amounts of the reading time by the use of this table.

Also, shading compensation is performed for the image data output from the front side image reading unit 65 in order to inhibit variations (maximum value and minimum value) in the light intensity of a light source in the main scanning direction. The process in step 19 is performed for each line of the image data after shading compensation. However, when the shading compensation is performed on a pixel basis for each line of the image data, the density correction may be performed together.

Incidentally, since the magnification variation of the image data depends on the type of paper as illustrated in FIG. 3 and FIG. 4, the above calculation of the magnification variation is preferably performed independently for the type of paper in each job of the image forming apparatus 1. Also, the correction of the reading time and the density correction of an image are preferably performed independently for each type of paper to be read by the use of the magnification variation of this each type of paper.

As has been discussed above, in accordance with the present embodiment, the image forming system includes the image forming apparatus 1 which forms an image on a sheet P, and the image reading apparatus 3 which is located in the downstream side of the image forming apparatus 1.

This image reading apparatus 3 includes the first conveyance roller pair 52 which conveys a sheet P output from the image forming apparatus 1, the back side image reading unit 60 which is located in the downstream side of the first conveyance roller pair 52 to read the back side of the sheet P, the second conveyance roller pair 53 which is located in the downstream side of the back side image reading unit 60, the front side image reading unit 65 which is located in the downstream side of the second conveyance roller pair 53 to read the front side of the sheet P, the third conveyance roller pair 54 which is located in the downstream side of the front side image reading unit 65, and the control unit 70 which controls the image reading apparatus 3.

In this case, the control unit 70 serves to perform the following functions. First, the control unit 70 compares the image data read by the back side image reading unit 60 and the image data read by the front side image reading unit 65, and calculates the nonlinear magnification variation of the image data of the front side image reading unit 65 as the magnification variation in relation to the image data of the back side image reading unit 60 (the arithmetic unit 71). Second, the control unit 70 corrects the reading time of the front side image reading unit 65 for each line based on the calculation result of the magnification variation (the image reading control unit 72). Third, in accordance with correction of the reading time, the control unit 70 performs image correction of the image data of the front side image reading unit 65 which has been corrected with respect to the reading time (the image correction unit 73).

By this configuration, since the nonlinear magnification variation is calculated to correct the reading time, it is possible to correct the reading time in accordance with the distribution of the magnification variation. Turbulence of images can thereby be inhibited. Also, since the magnification variation of the front side image reading unit 65 is calculated as the magnification variation in relation to the image data of the back side image reading unit 60, the difference of magnification can be inhibited between the front and back sides by correcting the reading time. Furthermore, it is possible to cancel the influence of the change (correction) of the reading time on an image by performing image correction in accordance with correction of the reading time.

Still further, in accordance with the present embodiment, the above magnification variation includes the magnification variation in the conveying direction due to the differential conveying speeds among the first conveyance roller 52, the second conveyance roller 53 and the third conveyance roller 54.

When there are differential conveying speeds among the first conveyance roller 52, the second conveyance roller 53 and the third conveyance roller 54, the magnification variation may occur in the conveying direction due to the differential conveying speeds. However, in accordance with the above configuration, the magnification variation is calculated based on the image data as read, and therefore the image can be corrected with reference to the magnification variation which is appropriately evaluated in the conveying direction.

Nevertheless, since the magnification variation is calculated based on the image data as read in the case of the image reading apparatus 3 of the present embodiment, it is possible to include various factors influencing the nonlinear magnification variation in addition to the influence of the variation in the conveying speed of the sheet P.

Also, in the case of the present embodiment, the image reading apparatus 3 receives a first sheet P which is reversed after a ladder pattern is formed thereon by the image forming apparatus 1, and a second sheet P on which a ladder pattern is formed by the image forming apparatus 1.

When the ladder pattern is formed by the image forming apparatus 1, the sheet P is contracted in the image formation process as well as the reading magnification. However, in the case of the present embodiment, while supplying two sheets P, one of the sheets P is reversed so that the similar paper surfaces (the front sides during image formation) on which a ladder pattern is formed can be read by the back side image reading unit 60 and the front side image reading unit 65 respectively. By this configuration, the relative magnification variation between the two sheets P can be determined so that the magnification variation caused by the speed variation can be appropriately determined irrespective of contraction of the sheet P during image formation.

Also, the degree of such contraction of a sheet P depends on the type of paper. In the case of the present embodiment, the magnification variation can be calculated for each type of paper corresponding to a job of the image forming apparatus 1 so that it is possible to effectively inhibit the positional misalignment between the front and back sides depending on the type of paper. Particularly, while a variety of paper types are used in the image forming apparatus 1, the magnification variation can be inhibited for such a variety of paper types by outputting sheets P on which a ladder pattern is formed from the image forming apparatus 1.

Furthermore, in the case of the present embodiment, the control unit 70 performs correction of the reading time per line in accordance with the magnification variation on a line-by-line basis.

In accordance with this configuration, the correction of the reading time can be performed, each time the read operation is performed, in accordance with the magnification variation in the reading position. Turbulence of images can thereby be inhibited.

Also, the control unit 70 of the present embodiment performs density correction of an image in accordance with the correction amount of the reading time.

In accordance with this configuration, it is possible to inhibit density unevenness due to the correction of the reading time.

Furthermore, the control unit 70 of the present embodiment performs shading compensation for each line of an image data after correction of the reading time, and performs density correction for each line of the image data after shading compensation on a line-by-line basis. Incidentally, the control unit 70 may perform density correction of an image for each line of an image data after correction of the reading time while performing the shading compensation on a line-by-line basis.

Meanwhile, in the case of the present embodiment, since the image data of the back side image reading unit 60 has a smaller magnification variation, the relative magnification variation of the image data of the front side image reading unit 65 is calculated in relation to the image data of the back side image reading unit 60. However, in the case where the image data of the front side image reading unit 65 has a smaller magnification variation, the relative magnification variation of the image data of the back side image reading unit 60 is calculated in relation to the image data of the front side image reading unit 65. In this case, the control unit 70 corrects the reading time of the back side image reading unit 60 for each line based on the calculation result of the magnification variation and performs image correction of the image data of the back side image reading unit 60, which has been corrected with respect to the reading time, in accordance with correction of the reading time.

Also, in accordance with the embodiment as described above, sheets P on which a ladder pattern is formed by the image forming apparatus 1 are input to the image reading apparatus 3 from the image forming apparatus 1. However, the sheets can be input through the sheet feeding unit 56 provided on the image reading apparatus 3. In this case, the sheets P on which a ladder pattern is formed may be test sheets on which a ladder pattern has been printed in advance in order that a magnification is guaranteed. These test sheets are bundled in a shipped product for the purpose of maintaining the performance of the image reading apparatus 3.

The ladder pattern can be read with the back side image reading unit 60 by setting the test sheets with the ladder pattern facing upward in the sheet feeding unit 56 and feeding the test sheets from the sheet feeding unit 56. In this case, the control unit 70 can calculate the nonlinear magnification variation by comparing the image data as read with the reference data indicative of the geometric characteristics of the ladder pattern. Then, based on this calculation result, the control unit 70 corrects the reading time of the back side image reading unit 60 for each line. Furthermore, in accordance with correction of the reading time, the control unit 70 performs image correction of the image data of the back side image reading unit 60 which has been corrected with respect to the reading time.

On the other hand, the ladder pattern can be read with the front side image reading unit 65 by setting the test sheets with the ladder pattern facing downward in the sheet feeding unit 56 and feeding the test sheets from the sheet feeding unit 56. In this case, the control unit 70 can calculate the nonlinear magnification variation by comparing the image data as read with the reference data indicative of the geometric characteristics of the ladder pattern. Then, based on this calculation result, the control unit 70 corrects the reading time of the front side image reading unit 65 for each line. Furthermore, in accordance with correction of the reading time, the control unit 70 performs image correction of the image data of the front side image reading unit 65 which has been corrected with respect to the reading time.

Still further, it is also possible to read a ladder pattern with the back side image reading unit 60 and read a ladder pattern with the front side image reading unit 65 in a successive manner by setting a test sheet with the ladder pattern facing upward and a test sheet with the ladder pattern facing downward in the sheet feeding unit 56 in a stacked state and successively feeding the test sheets. In this case, the nonlinear magnification variation can be calculated by referring to the reference data or by comparing the image data of the back side image reading unit 60 and the image data of the front side image reading unit 65 as the nonlinear magnification variation of the image data of the front side image reading unit 65 in relation to the image data of the back side image reading unit 60 as illustrated in the above embodiment.

Still further, it is also possible to make use of a test sheet with a ladder pattern printed on the opposite sides thereof and read the ladder pattern by the back side image reading unit 60 and the front side image reading unit 65 at once.

The foregoing description has been presented based on the image forming system according to the present invention. However, it is not intended to limit the present invention to the precise form described, and obviously many modifications and variations are possible within the scope of the invention. The present invention can be considered to relate also to the image reading apparatus itself as a part of the image forming system. Also, while the control units of the apparatuses cooperate to perform the processes in the case of the present embodiment, these control units can be integrated as the control unit of the image forming apparatus serving to perform the processes of these control units, or a separate control apparatus can be provided for performing the above processes which are explained in conjunction with the present embodiment.

Furthermore, while the image reading apparatus is provided in the downstream side of the image forming apparatus in the case of the embodiment as described above, the present invention is applicable to an original reading unit is incorporated in an image forming apparatus.

Still further, while each line is read on a line-by-line basis in the case of the embodiment as described above, each line may be read by reading a plurality of lines with the same timing with an image reading unit which can read en bloc a plurality of lines.

What is claimed is:

1. An image reading apparatus comprising:
   a first conveyance unit structured to convey a sheet;
   a first image reading unit located in a downstream side of the first conveyance unit in a conveying direction, and structured to read the sheet for each line in a sheet width direction and output image data;
   a second conveyance unit located in a downstream side of the first image reading unit in the conveying direction, and structured to convey the sheet;
   an arithmetic unit structured to calculate a nonlinear magnification variation based on the image data read by the first image reading unit with respect to the sheet on which a predetermined pattern is formed;
   an image reading control unit structured to correct a reading time per line of the first image reading unit based on the calculation result by the arithmetic unit; and
   an image correction unit structured to perform, in accordance with correction of the reading time, image correction of the image data of the first image reading unit which has been corrected by the image reading control unit with respect to the reading time.

2. The image reading apparatus of claim 1, wherein the magnification variation includes a magnification variation in the conveying direction caused by a differential conveying speed between the first conveyance unit and the second conveyance unit.

3. The image reading apparatus of claim 1 further comprising:
   a second image reading unit located in a downstream side of the second conveyance unit in the conveying direction, and structured to read, for each line in the sheet width direction, a second paper surface of the sheet opposite a first paper surface which is a paper surface of the sheet read by the first image reading unit, and output image data; and
   a third conveyance unit located in a downstream side of the second image reading unit and structured to convey the sheet, wherein
   the arithmetic unit calculates a nonlinear magnification variation based on the image data read by the second image reading unit with respect to the sheet on which the predetermined pattern is formed, wherein
   the image reading control unit corrects a reading time per line of the second image reading unit based on the calculation result by the arithmetic unit, and wherein
   the image correction unit performs, in accordance with correction of the reading time, image correction of the image data of the second image reading unit which has been corrected by the image reading control unit with respect to the reading time.

4. The image reading apparatus of claim 3, wherein the magnification variation includes a magnification variation in the conveying direction caused by differential conveying speeds among the first conveyance unit, the second conveyance unit and the third conveyance unit.

5. The image reading apparatus of claim 3 further comprising:

a sheet receiving unit structured to receive the sheet on which the predetermined pattern is formed by an image forming apparatus, and transfer the received sheet to the first conveyance unit.

6. The image reading apparatus of claim 5, wherein
the sheet receiving unit is supplied with a first sheet which is front/back reversed after the predetermined pattern is formed thereon by the image forming apparatus, and a second sheet on which the predetermined pattern is formed by the image forming apparatus, and wherein
the arithmetic unit compares the image data of the first image reading unit and the image data of the second image reading unit, and calculates a relative magnification variation of one image data in relation to the other image data.

7. The image reading apparatus of claim 6, wherein
the arithmetic unit calculates the relative magnification variation of the image data of the second image reading unit in relation to the image data of the first image reading unit.

8. The image reading apparatus of claim 6, wherein
the arithmetic unit calculates the relative magnification variation of the image data of the first image reading unit in relation to the image data of the second image reading unit.

9. The image reading apparatus of claim 1 wherein
the sheet on which the predetermined pattern is formed is a test sheet on which the predetermined pattern has been printed in advance in order that a magnification is guaranteed, and further comprising:
a sheet feeding unit structured to feed the test sheet to the image reading apparatus.

10. The image reading apparatus of claim 1, wherein
the image reading control unit corrects the reading time per line in accordance with the magnification variation on a line-by-line basis.

11. The image reading apparatus of claim 1, wherein
the image correction unit performs density correction of an image in accordance with a correction amount of the reading time.

12. The image reading apparatus of claim 11, wherein
the image correction unit performs shading compensation for each line of an image data after correction of the reading time, and performs density correction for each line of the image data after shading compensation on a line-by-line basis.

13. The image reading apparatus of claim 11, wherein
the image correction unit performs shading compensation and the density correction for each line of the image data after correction of the reading time on a line-by-line basis.

14. An image forming system comprising:
an image forming apparatus structured to form an image on a sheet; and
an image reading apparatus located in a downstream side of the image forming apparatus in a conveying direction,
the image reading apparatus comprising:
a first conveyance unit structured to convey the sheet output from the image forming apparatus;
a first image reading unit located in a downstream side of the first conveyance unit in the conveying direction, and structured to read the sheet for each line in a sheet width direction and output image data;
a second conveyance unit located in a downstream side of the first image reading unit in the conveying direction, and structured to convey the sheet;
a second image reading unit located in a downstream side of the second conveyance unit in the conveying direction, and structured to read, for each line in the sheet width direction, a second paper surface of the sheet opposite a first paper surface which is a paper surface of the sheet read by the first image reading unit, and output image data;
a third conveyance unit located in a downstream side of the second image reading unit and structured to convey the sheet;
an arithmetic unit structured to compares the image data read by the first image reading unit and the image data read by the second image reading unit, and calculate a nonlinear magnification variation of one image data as a relative magnification variation in relation to the other image data;
an image reading control unit structured to correct a reading time per line of the image reading unit, which outputs the one image data, based on the calculation result by the arithmetic unit; and
an image correction unit structured to perform, in accordance with correction of the reading time, image correction of the image data of the image reading unit which has been corrected by the image reading control unit with respect to the reading time.

15. The image forming system of claim 14 wherein
the image reading apparatus is supplied with a first sheet which is front/back reversed after a predetermined pattern is formed thereon by the image forming apparatus, and a second sheet on which the predetermined pattern is formed by the image forming apparatus.

16. The image forming system of claim 15, wherein
the arithmetic unit calculates a relative magnification variation of the image data of the second image reading unit in relation to the image data of the first image reading unit.

17. The image forming system of claim 15, wherein
the arithmetic unit calculates a relative magnification variation of the image data of the first image reading unit in relation to the image data of the second image reading unit.

* * * * *